(12) United States Patent
Jones et al.

(10) Patent No.: US 6,989,053 B2
(45) Date of Patent: Jan. 24, 2006

(54) INK-JET INKS EXHIBITING INCREASED SLEWING DECAP TIME

(75) Inventors: Jeffrey E. Jones, Oceanside, CA (US); Rodney D. Stramel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 117 days.

(21) Appl. No.: 10/459,913

(22) Filed: Jun. 11, 2003

(65) Prior Publication Data

US 2004/0250727 A1    Dec. 16, 2004

(51) Int. Cl.
C09D 11/02    (2006.01)
B41J 2/01    (2006.01)

(52) U.S. Cl. .................... 106/31.43; 347/100
(58) Field of Classification Search ........... 106/31.43; 347/100

See application file for complete search history.

(56) References Cited

U.S. PATENT DOCUMENTS

| | | | | |
|---|---|---|---|---|
| 5,593,486 | A | 1/1997 | Oliver et al. | 106/31.32 |
| 5,718,793 | A | 2/1998 | Inamoto et al. | 156/235 |
| 6,000,793 | A | 12/1999 | Inamoto | 347/101 |
| 6,001,463 | A | 12/1999 | Shibahara et al. | 428/32.25 |
| 6,183,851 | B1 | 2/2001 | Mishima | 428/32.34 |
| 6,187,083 | B1 | 2/2001 | Malhotra et al. | 106/31.29 |
| 2002/0121219 | A1 * | 9/2002 | Stramel et al. | 106/31.27 |

FOREIGN PATENT DOCUMENTS

| | | |
|---|---|---|
| EP | 0976570 A1 | 2/2000 |
| EP | 1072430 A2 | 1/2001 |
| WO | WO98/04640 | 2/1998 |

OTHER PUBLICATIONS

Derwent abstract of JP57/087477, May 1982.*
MiyamotoArata, et al., Printing Ink Composition, Publication No. 57-087477, Section C., No. 123, vol. 06, No. 174, p. 13, May 1982.

* cited by examiner

Primary Examiner—Helene Klemanski

(57) ABSTRACT

The present invention provides ink-jet inks and methods for increasing slewing time of an ink-jet ink pen without significant decap. The composition can comprise an effective amount of a dye, an effective amount of an ink vehicle, and an effective amount of an anti-slewing decap agent comprising an alkyl aryl sulfonamide. In one embodiment, the anti-slewing decap agent consists essentially of the alkyl aryl sulfonamide. With regard to the method, the steps can including formulating the composition; loading the ink-jet ink in an ink-jet pen; and configuring the ink-jet pen to allow for increased slewing time between firing. Additionally, a system of printing high quality images with reduced slewing decap can comprise an ink-jet ink pen configured for firing non-image producing spits at from 3 and 6 second intervals, an ink-jet ink composition having an effective amount of an alkyl aryl sulfonamide present, and a substrate for accepting the ink-jet ink composition such that the high quality image is formed.

19 Claims, No Drawings

INK-JET INKS EXHIBITING INCREASED SLEWING DECAP TIME

FIELD OF THE INVENTION

The present invention is drawn to ink-jet inks that can print high quality images with increased slewing time.

BACKGROUND OF THE INVENTION

As dye-based ink-jet inks have typically provided line quality and accuracy of plots that are generally inferior to pigment-based ink-jet inks, there has been increased interest in improving print quality resulting from the use of dye-based ink-jet inks. One problem associated with reduced line quality and accuracy of plots of dye-based ink-jet inks is directly related to a problem known as capping or decap. To avoid the problems associated with decap, pens are fired periodically at times other than when printing on a desired substrate, resulting in wasted ink-jet ink. The time between two firings is called slewing time. Thus, by increasing slewing time, less ink-jet ink is wasted and the ink-jet printer does not have to work as hard. One method of increasing slewing time that is known in the prior art is to increase the kinetic energy of the drop ejected from the pen. However, increasing the kinetic energy also tends to increase the spray, drop weight, and/or other image quality degrading characteristics. As slewing decap is a problem in the ink-jet arena, it would be desirable to provide ink-jet ink formulations that maintain good image quality when printed with reduced decap resulting from slewing.

SUMMARY OF THE INVENTION

A dye-based ink-jet ink composition can comprise an effective amount of a dye; an effective amount of an ink vehicle; and an effective amount of an anti-slewing decap agent comprising an alkyl aryl sulfonamide. In one embodiment, the anti-slewing decap agent consists essentially of the alkyl aryl sulfonamide.

Additionally, a method for increasing slewing time of an ink-jet ink pen without significant decap can comprise the steps of formulating an ink-jet ink composition having an effective amount of a dye, an effective amount of an ink vehicle, and an effective amount of an anti-slewing decap agent comprising an alkyl aryl sulfonamide; loading the ink-jet ink in an ink-jet pen; and configuring the ink-jet pen to allow for increased stewing time between firing.

A system of printing high quality images with reduced slewing decap can comprise an ink-jet ink pen configured for firing non-image producing spits at from 3 and 6 second intervals; an ink-jet ink composition contained substantially within the ink-jet ink pen, wherein the ink-jet ink composition comprises an effective amount of a dye, an effective amount of an ink vehicle, and an effective amount of an anti-slewing decap agent comprising an alkyl aryl sulfonamide; and a substrate for accepting the ink-jet ink composition such that the high quality image is formed.

DETAILED DESCRIPTION OF THE INVENTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "an ink" includes reference to one or more of such inks.

As used herein, "sufficient amount" or "effective amount" refers to the minimal amount of a substance or agent, which is present in high enough quantities or concentration to achieve a desired effect. For example, an effective amount of an "ink vehicle" is the minimum amount required in order to create an ink that will meet functional performance and characteristic standards. Alternatively, a sufficient amount of an alkyl aryl sulfonamide is an amount that will provide desired slewing decap properties.

As used herein, "ink vehicle," refers to the vehicle in which the colorant is suspended, dispersed, or solubilized to form an ink. Ink vehicles are well known in the art, and a wide variety of ink vehicles may be used with the ink composition of the present invention. Such ink vehicles may include a mixture of a variety of different agents, including without limitation, solvents, co-solvents, buffers, biocides, chelating agents, surface-active agents, and water.

"Slewing" refers to the time period while an ink-jet ink pen is in an active mode, but is in between the firing of drops.

"Alkyl" when referring to an alkyl aryl sulfonamide shall include carbon chains having from 1 to 6 carbon atoms. Preferably, the alky group is butyl.

"Aryl" when referring to an alkyl aryl sulfonamide shall include an aromatic ring attached to the sulfur of the sulfonamide group, or an aralkyl having from 1 to 4 carbon atoms bridging the sulfur of the sulfonamide and a carbon atom of the aromatic ring structure. An example of a preferred aryl group is benzene, and an example of a preferred aralkyl group is a benzyl.

The alkyl and aryl groups can also be substituted to the extent that such substituents do not adversely affect the anti-slewing properties of the alkyl aryl sulfonamide.

"Anti-slewing decap agent" can include compositions that are added to the dye and the ink vehicle, and perform the function of increasing slewing decap performance, e.g., increase time between required spits or increase in slewing time.

In the ink-jet arena, it is important that all drops printed on a substrate look substantially similar so that clear and high quality images can be produced. Working against this goal are properties resulting from slewing decap. For example, ink-jet inks at a printing orifice can crust to some degree, diminishing the print quality that can be achieved. It is known that the crusting that occurs during slewing can be substantially prevented by systematically firing the pen in the form of spits when not printing on the target substrate in order to keep the printing orifice fresh. This spitting process wastes a certain amount of ink-jet ink. In other words, in order to keep the ink-jet pen orifice fresh, the pen must waste some ink in order to keep the orifice ready to fire at all times. This is particularly true with respect to the first drop of ink to be ejected onto a substrate. Any tool that can be used to decrease the amount of wasted ink in the form of spits (by reducing their volume or frequency) would be helpful in this area of the ink-jet ink arts.

With this in mind, a dye-based ink-jet ink composition can comprise an effective amount of a dye; an effective amount of an ink vehicle; and an effective amount of an anti-slewing decap agent comprising an alkyl aryl sulfonamide. In one embodiment, the anti-slewing decap agent consists essentially of the alkyl aryl sulfonamide. The alkyl group can be lower alkyl such as methyl, ethyl, or straight or branched chain propyl, butyl, pentyl, or hexyl groups. The aryl group can be preferably benzene or benzyl, though other aryl or aralkyl groups can be used. In the most preferred embodiment, the alkyl aryl sulfonamide is N-butyl benzene sulfonamide (BBSA). No matter what alkyl aralky sulfonamide is used, it is preferred that it be present in the ink-jet ink composition at from 0.05% to 1.0% by weight. More preferred is the use of the alkyl aryl sulfonamide in the ink-jet ink at from 0.3% to 0.7% by weight. Still further, in one embodiment, the alkyl aryl sulfonamide can be present in the composition at about 0.5% by weight.

With respect to the colorants that can be used, the present invention is particularly adapted for use with black dye-based ink-jet inks, though color dyes can also be used. Examples of suitable dyes include a large number of water-soluble acid and direct dyes. Specific examples of dyes include the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132); Aminyl Brilliant Red F-B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RIP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof; and the like. Examples of preferred dyes can include DB 168 and PRB 31.

With respect to the ink vehicle component of the composition, any suitable vehicle components including solvents, co-solvents, buffers, biocides, chelating agents, viscosity modifiers, surface-active agents, and water can be used. In one embodiment, an ink-jet ink composition such as that found in a Hewlett-Packard ink-jet pen having part number HPC5019A provides an example of vehicle and dye component combination that can be used with the present invention.

With the ink-jet ink compositions of the present invention, increased slewing can occur without substantial degradation of image quality. For example, slewing times of up to 5.5 seconds or greater can be implemented, while still maintaining acceptable image quality. In one embodiment, when using 0.5% by weight BBSA in a Hewlett-Packard ink-jet pen having part number HPC5019, stewing times of up to 5.5 seconds can be achieved while maintaining acceptable image quality.

A method for increasing slewing time of an ink-jet ink pen without significant capping can comprise the steps of formulating an ink-jet ink having an effective amount of a dye, an effective amount of an ink vehicle, and an effective amount of an anti-slewing decap agent comprising an alkyl aryl sulfonamide; loading the ink-jet ink in an ink-jet pen; and configuring the ink-jet pen to allow for increased slewing time between firing. In one embodiment, the anti-slewing decap agent consists essentially of the alkyl aryl sulfonamide. By increased slewing time, what is meant is a greater amount of slewing time of at least 10% as compared to the same ink-jet ink composition without the added alkyl aryl sulfonamide. Particularly, the alkyl group can be lower alkyl such as methyl, ethyl, or straight or branched chain propyl, butyl, pentyl, or hexyl. The aryl group can preferably be benzene, though other aryl groups can be used. In one embodiment of the method, the alkyl aryl sulfonamide can be N-butyl benzene sulfonamide (BBSA).

The alkyl aryl sulfonamide can be added at from 0.05% to 1% by total composition weight. In a more detailed aspect of the invention, the alkyl aryl sulfonamide can be added at from 0.3% to 0.7% by weight. Further, in one embodiment, about 0.5% by weight of the alkyl aryl sulfonamide can be added to the ink-jet ink composition. Like the composition, the method can use any dye or ink-jet ink vehicles that are functional, including the dyes listed previously. However, DB 168 and PRB 31 are preferred dyes that can be used.

With the method of the present invention, it is preferred that the ink-jet ink exhibits improved image quality after slewing for up to 5.5 seconds or even more. In fact, as stated, by adding an alkyl aryl sulfonamide to many ink-jet ink compositions known in the art, it has been shown that 36.8% more slewing time can be realized with similar image quality in many instances.

A system of printing high quality images with reduced slewing decap can comprise an ink-jet ink pen configured for firing non-image producing spits at from 3 and 6 second intervals; an ink-jet ink composition contained substantially within the ink-jet ink pen, wherein the ink-jet ink composition comprises an effective amount of a dye, an effective amount of an ink vehicle, and an effective amount of an anti-slewing decap agent comprising an alkyl aryl sulfonamide; and a substrate for accepting the inkjet ink composition such that the high quality image is formed. Again, in one embodiment, the anti-slewing decap agent consists essentially of the alkyl aryl sulfonamide. Though any alkyl aryl sulfonamide can be used, preferably the alkyl aryl sulfonamide can be N-butyl benzene sulfonamide. Further, the alkyl aryl sulfonamide can be present in the composition at from 0.05% to 1.0% by weight.

EXAMPLE

The following example illustrates preferred embodiments of the invention that is presently best known. However, other embodiments can be practiced that are also within the scope of the present invention. Eight ink-jet ink pens containing black ink-jet ink were obtained, each bearing Hewlett-Packard part number HP-CO13A. The ink-jet inks in pens 1–4 were not modified. However, the ink-jet inks in pens 5–8 were modified by adding 0.5% by weight of BBSA (N-butyl benzene sulfonamide) to each ink. Slewing decap performance tests were conducted by allowing four predetermined slewing times to occur prior to printing a character, and the characters were compared and ranked using a predetermined ranking system. In these tests, the character was a thin line. Table 1 below shows the results for the ink-jet inks without BBSA added thereto (Pens 1–4):

TABLE 1

| Pen No. | 2.5 sec. slewing | 3.8 sec. slewing | 5.2 sec. slewing | 5.5 sec. slewing |
| --- | --- | --- | --- | --- |
| 1 | 4.5 | 4.5 | 4.0 | 4.0 |
| 2 | 5.0 | 5.0 | 3.5 | 3.5 |
| 3 | 5.0 | 5.0 | 4.0 | 3.2 |
| 4 | 4.5 | 3.0 | 3.0 | 3.0 |
| Average | 4.75 | 4.375 | 3.625 | 3.425 |

Table 2 below shows the results for the ink-jet inks having BBSA added thereto (Pens 5–8):

TABLE 2

| Pen No. | 2.5 sec. slewing | 3.8 sec. slewing | 5.2 sec. slewing | 5.5 sec. slewing |
| --- | --- | --- | --- | --- |
| 5 | 4.5 | 4.0 | 4.0 | 4.0 |
| 6 | 5.0 | 4.0 | 4.0 | 3.5 |
| 7 | 5.0 | 4.5 | 4.5 | 4.0 |
| 8 | 5.0 | 5.0 | 5.0 | 5.0 |
| Average | 4.875 | 4.375 | 4.375 | 4.125 |

In Table 1 and Table 2 above, the following ranking system was used. For a thin line character to obtain a ranking of 5, the character must be virtually perfect compared to its intended print quality. In other words, in the present example, the character was a thin dark line having crisp edges. To obtain a ranking of 4, a thin line character is printed that looks virtually identical to the naked eye to the thin line character achieving a rank of 5. However, under closer examination with a low power microscope, a small amount of wandering of ink-jet ink dots can be detected. In other words, some close satellite spotting can be observed due to the drop breaking apart and slower velocity of the ink-jet ink fired from the pen. To obtain a ranking of 3, more of what was described with a ranking of 4 is observed, but the difference between a 3 ranking and a 5 ranking starts to become visible to the naked eye. Generally, a ranking of 2 appears fuzzy along the edges and the image is not as dark or crisp as desired. A ranking of 1 is inferior in every way, and is unacceptable for high quality printing image generation.

As can be seen by comparing the results of Table 1 (no BBSA added) and Table 2 (addition of BBSA), after longer slewing time such as more than about 5.2 seconds, the quality of the image printed can be kept at reasonable levels. In fact, by comparing the averages, at 5.5 seconds of slewing, the ink-jet inks containing BBSA on average provided image quality that was about 20% better than those ink-jet inks that did not contain BBSA. Further, inks from pens 5–8 (BBSA added) produced images after 5.2 seconds of slewing of identical quality to inks from pens 1–4 (no BBSA) after 3.8 seconds of slewing, which is greater than 36% more stewing time.

While the invention has been described with reference to certain preferred embodiments, those skilled in the art will appreciate that various modifications, changes, omissions, and substitutions can be made without departing from the spirit of the invention. For example, though a specific vehicle is shown in the Examples, other vehicles can also be used. It is intended, therefore, that the invention be limited only by the scope of the following claims.

We claim:

1. A dye-based ink-jet ink composition, comprising:
   (a) an effective amount of a dye;
   (b) an effective amount of an ink vehicle; and (c) an effective amount of an anti-slewing decap agent comprising N-butyl benzene sulfonamide.

2. A dye-based ink-jet ink composition as in claim 1 wherein the anti-slewing decap agent consists essentially of the N-butyl benzene sulfonamide.

3. A dye-based ink-jet ink composition as in claim 1 wherein the N-butyl benzene sulfonamide is present in the composition at from 0.05% to 1.0% by weight.

4. A dye-based ink-jet ink composition as in claim 3 wherein the N-butyl benzene sulfonamide is present in the composition at from 0.3% to 0.7% by weight.

5. A dye-based ink-jet ink composition as in claim 4 wherein the N-butyl benzene sulfonamide is present in the composition at about 0.5% by weight.

6. A dye-based ink-jet ink composition as in claim 1 wherein the dye is selected from the group consisting of DB 168 and PRB 31.

7. A dye-based ink-jet ink composition as in claim 1 wherein the ink-jet ink composition can be allowed to slew for up to 6 seconds without a substantial reduction in image quality.

8. A method for increasing slewing time of an ink-jet ink pen without significant decap, comprising:
（a) formulating an ink-jet ink, comprising:
(i) an effective amount of a dye,
(ii) an effective amount of an ink vehicle, and
(iii) an effective amount of an anti-slewing decap agent comprising an alkyl aryl sulfonamide;
(b) loading said ink-jet ink in an ink-jet pen; and
(c) configuring the ink-jet pen to allow for increased slewing time between firing, compared to an identical ink-jet ink without the alkyl aryl sulfonamide present.

9. A method as in claim 8 wherein the anti-slewing decap agent consists essentially of the alkyl aryl sulfonamide.

10. A method as in claim 8 wherein the alkyl aryl sulfonamide is N-butyl benzene sulfonamide.

11. A method as in claim 8 wherein the alkyl aryl sulfonamide is present in the composition at from 0.05% to 1.0% by weight.

12. A method as in claim 8 wherein the dye is selected from the group consisting of DB 168 and PRB 31.

13. A method as in claim 8 wherein the ink-jet ink exhibits improved slewing for up to 5.5 seconds over similar ink-jet inks that do not contain the alkyl aryl sulfonamide.

14. A method as in claim 8 wherein said increased slewing time between firing is at least 36.8% greater than the ink-jet ink without the alkyl aryl sulfonamide present.

15. A system of printing high quality images with reduced slewing decap, comprising:
(a) an ink-jet ink pen configured for firing non-image producing spits at from 3 to 6 second intervals;
(b) an ink-jet ink composition contained substantially within the ink-jet ink pen, said ink-jet ink composition comprising:
(i) an effective amount of a dye,
(ii) an effective amount of an ink vehicle, and
(iii) an effective amount of an anti-slewing decap agent comprising an alkyl aryl sulfonamide; and
(c) a substrate for accepting the ink-jet ink composition such that the high quality image is formed.

16. A system as in claim 15 wherein the anti-slewing decap agent consists essentially of the alkyl aryl sulfonamide.

17. A system as in claim 15 wherein the alkyl aryl sufamide is N-butyl benzene sulfonamide.

18. A system as in claim 17 wherein the alkyl aryl sulfonamide is present in the composition at from 0.05% to 1.0% by weight.

19. A system as in claim 15 wherein the ink-jet ink pen is configured for firing non-image producing spits at from 5 to 6 second intervals.

* * * * *